Feb. 24, 1970

P. D. WEINER 3,497,246

HIGH PRESSURE, LOW STRESS TUBULAR CONNECTION

Filed Dec. 26, 1967

*INVENTOR.*
PETER D. WEINER,
BY John S. Schneider
ATTORNEY.

United States Patent Office 3,497,246
Patented Feb. 24, 1970

3,497,246
HIGH PRESSURE, LOW STRESS TUBULAR CONNECTION
Peter D. Weiner, Bryan, Tex., assignor to Esso Production Research Company
Filed Dec. 26, 1967, Ser. No. 693,296
Int. Cl. F16l 15/00
U.S. Cl. 285—333                      6 Claims

ABSTRACT OF THE DISCLOSURE

Two tubular members coaxially arranged, each tubular member being provided with an external, tapered, threaded (pin) portion and an internal recessed portion adjacent the extremity thereof; an internally threaded coupling or box member connected to the external threaded portions of said tubular members and being sufficiently long to encompass both of said recessed portions; said recessed portions having a selected length and depth adapted to obtain a sealing surface at the extremities of said tubular members through premature yielding.

BACKGROUND OF THE INVENTION

The present invention concerns a novel coupling arrangement for connecting tubular members subjected to high internal pressure. In particular, the present invention is directed to a well pipe or tubing coupling designed to form a fluid-tight connection.

In many operations connected with the drilling of oil and/or gas wells and the production of hydrocarbons therefrom, it is necessary to use strings of pipe which are tubular members connected together in a fluid-tight relationship to form a conduit for the hydrocarbon fluids. Currently, in such well operations, well depths are deeper and well pressures are higher than ever before encountered.

The present invention provides a high-pressure, leak-resistant tubing connection that is low in cost. It has been found that in order to have maximum leak resistance, the end of the pin should be yielded slightly; however, in order to accomplish this, especially in heavy-walled connections, the coupling stress approaches its yield strength, which is very detrimental. The connection of the present invention alleviates the problem of having high induced stresses on the coupling because the amount of makeup required is governed by the calculated dimensions of the tubing extremity or end of the pin. The recess feature of the invention also increases the self-energizing effect of the pin on the coupling caused by the action of internal pressure due to the increase in the effective internal diameter at the end of the pin.

SUMMARY OF THE INVENTION

Briefly, the device of the present invention comprises a tubular member having a tapered, threaded, external portion and an internal recessed portion having a selected depth and length adjacent the extremity thereof. The tubular member is joined to a similar tubular member by threaded connections to an internally threaded coupling member. The selected length and depth of the recessed portions are determined by calculations to obtain a sealing surface at the ends of the tubular members through premature yielding.

DESCRIPTION OF THE PREFERRED EMBODIMENT

Figure 1:
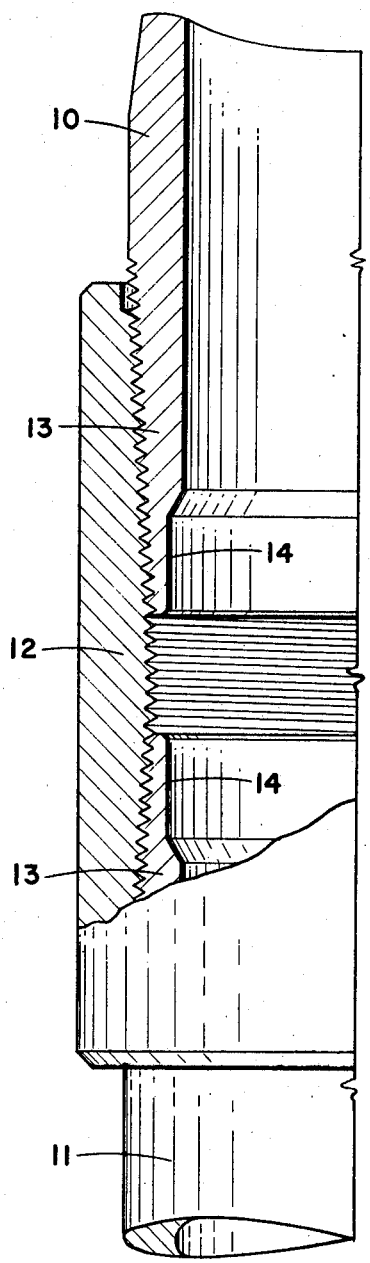
FIG. 1 is a vertical view, partly in section, of the tubular members coupled together.
Figure 2:
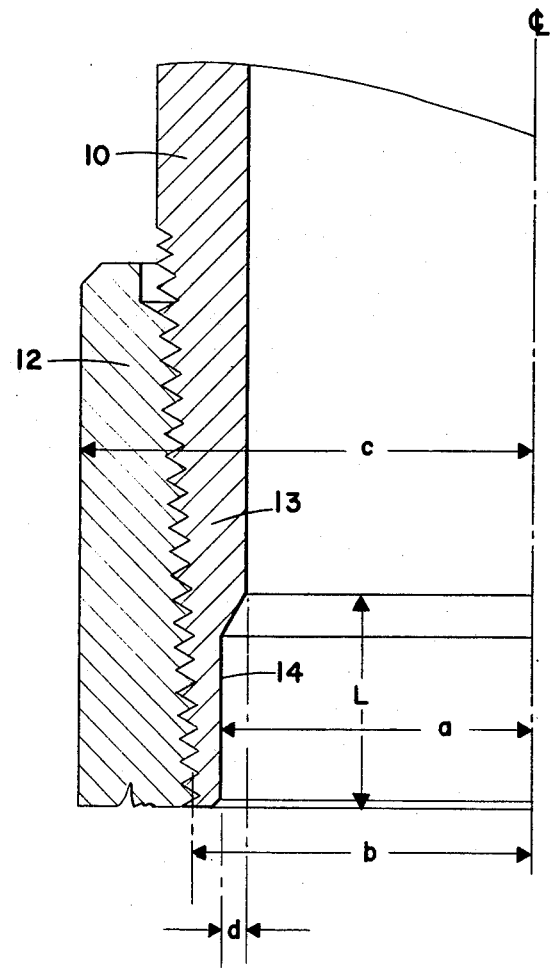
FIG. 2 is an enlarged view of one tubular member threaded to a coupling member.

As shown in FIGS. 1 and 2, tubular members 10 and 11 are connected together by a cylindrical, internally threaded coupling or box member 12. The standard tapered pins 13 and tubular members 10 and 11 are recessed about the entire internal diameter of the pin adjacent the ends thereof, as indicated at 14, for a length (L) and a depth (d).

The critical dimensions for depth (d) of the recess are determined from calculations. The critical dimension (L) may vary from a minimum of four times the pitch to a maximum of ($L_1$), the distance from the end of the tubular member (pin) to the hand-tight plane. A sample calculation for a 2⅜ inch EUE 4.7 lbs. per foot N–80 API tubing connection follows:

$2a$ = inside diameter pin, in.
$2b$ = pitch diameter hand-tight plane, in.
$2c$ = outside diameter of the coupling, in.
$2a_d$ = inside diameter at recess, in.
$\delta$ = interference between mating parts, in.
N = number of turns past intimate contact between coupling and pin.
T = thread taper, in./in.
P = thread pitch, in./thd.
E = modulus of elasticity, p.s.i.
$P_b$ = pressure between mating surfaces, p.s.i.
$\delta t$ = tangential or hoop stress, p.s.i.
$\delta y$ = yield strength, p.s.i.
$d$ = depth of recess, in.
$L_1$ = distance from the hand-tight plane to the end of the pin, in.
$2b_d$ = pitch diameter at end of pin, in.
L = length of recess, in.

Using the equation for the stress on the inside surface of a hollow tube due to a shrink fit, the dimension ($d$) at the end of the pin may be calculated by the use of Equations 2, 3, and 4 and the following dimensions as obtained in API Std. 5A:

$2a$ = 1.995 in.; $a$ = 0.9975 in.
$2b$ = 2.508 in.
$2c$ = 3.063 in.
T = 0.0625 in./in.
P = 0.125 in./thd.
$\delta y$ = 80,000 p.s.i
$L_1$ = 1.154 in.
E = 30×10⁶ p.s.i.

The dimension $2b_d$ at the end of the pin is determined as follows:

Equation 1
$$2b_d = 2b - (T)(L_1)$$
$$= 2.508 - (0.0625)(1.154)$$
$$= 2.508 - 0.0721$$
$$2b_d = 2.426 \text{ in.}$$

$a$ = ?
$b$ = 1.213
$c$ = 1.532
$b^2$ = 1.471
$c^2$ = 2.35

Equation 2
$$\delta t_a = -\frac{2 p_b b^2}{b^2 - a^2} \text{ (Timoshenko p. 209)}^a$$

solving for ($a$) from Equation 2.

Equation 3
$$a = b\left[1 + \frac{2 P_b}{\delta t_a}\right]^{1/2}$$

Since yield desired at the end of the pin $\delta t_a = -80,000$ p.s.i., and a mating pressure at approximately 8000 p.s.i.$=P_b$ is desired, then solving for $(a)$ in (3)

$$a_d = 1.213 \left[ 1 + \frac{(2)(8000)}{-80,000} \right]^{1/2}$$

$$a_d = 1.0844 \text{ in.}$$

Using the original inside radius $(a)$ of the pin of 0.9975 inch, dimension $(d)$ may be obtained from Equation 4.

Equation 4

$$d = a_d - a$$
$$d = 1.0844 - 0.9975$$
$$d = 0.0869 \text{ in.}$$

In order to determine the number of turns (N) needed to yield the end of the pin and to give a mating pressure $P_b = 8000$ p.s.i., the following Equations 5 and 6 are combined into Equation 7.

Equation 5

$$P_b = \frac{E\delta(b^2-a^2)(c^2-b^2)}{2b(b^2)(c^2-a^2)} \text{ (Timoshenko p. 214)}^a$$

Equation 6

$$\delta = \frac{(T)(P)(N)}{2}$$

Equation 7

$$N = \frac{(2b)(b^2)(c^2-a^2)(P_b)(2)}{(E)(b^2-a^2)(c^2-b^2)(T)(P)}$$

using $P_b = 80,000$ p.s.i., and $a_d = 1.0844$ in.

$$N = \frac{(2)(1.213)(1.471)(2.35-1.176)(8000)(2)}{(30 \times 10^6)(1.471-1.176)(2.35-1.471)(0.0625)(0.125)}$$

$N = 1.108$ turns

Similar calculation may be made on various other sizes and grades of tubing and casing.

The tapered pin and box with the recessed or counterbored pin will cause the pin end to yield prematurely (that is, much sooner than the adjoining pin section) during makeup and cause a pressure seal between the pin and box without inducing excessive coupling stresses as are presently produced in thick, heavy-walled tubing and casing connections. Thus, when the tapered threaded lip is screwed into the tapered threaded coupling or box and yields prematurely, i.e., sooner than the remaining pin section, during makeup, a seal is formed at the threaded interface without reducing the tensile strength of the connection or increasing the hoop stresses in the coupling excessively.

The invention is not to be considered as restricted to the threaded and coupled pipe shown and described with respect to the preferred embodiment of the invention. The invention is also useful with integral connections. Further, the invention is applicable for use not only in tubing, casing, and line pipe, but in any high pressure application that involves connecting of tubular members together. Although an API-type thread is used in the example given in the description, the invention is applicable to other threaded forms.

Having fully described the objects, advantages, apparatus, and operation of my invention, I claim:

1. A first male tubular member adapted to be connected to a second female tubular member and usable in conducting high pressure fluids, said first tubular member having a tapered end portion threaded externally and recessed internally, said recess having a selected length (L) extending from the beginning of said recess to the end of said first tubular member, the threads on said first tubular member extending from the end thereof axially at least over the length of said recess until said threads

---

[a] S. S. Timoshenko, Strength of Materials, Part II. D. Van Nostrand Company, Inc., Princeton, N.J., third edition (1956).

intersect with the radial outermost portion of said first tubular member, said recess also having a selected depth $(d)$ extending radially from the interior unrecessed surface of said first tubular member to the surface of deepest depth of said recess to form a pressure seal at the threaded interface between said end portion of said first tubular member and said second tubular member when said tubular members are threadedly connected together, through premature yielding, said depth $(d)$ of said recess being calculable in accordance with the following equations:

(1) $\quad 2b_d = 2b - (T)(L_1)$ (2) $\quad \delta_{t_a} = \dfrac{2P_b b^2}{b^2 - a^2}$ (3) $\quad a = b\left[1 + \dfrac{2P_b}{\delta_{t_a}}\right]^{1/2}$ (4) $\quad d = a_d - a$ where:

$2b_d$ = pitch diameter at end of pin (first tubular member), in.
$2b$ = pitch diameter hand-tight plane, in.
$T$ = thread taper, in./in.
$L_1$ = distance from the hand-tight plane to the end of the pin (first tubular member), in.
$\delta t_a$ = tangential or hoop stress, p.s.i.
$P_b$ = pressure between mating surfaces, p.s.i.
$a$ = ½ inside diameter pin (first tubular member), in.
$a_d$ = ½ inside diameter at recess, in.
$d$ = depth of recess, in.

2. A tubular member as recited in claim 1 in which the length (L) of said recess varies from a minimum of approximately four times the pitch to a maximum of the distance from the end of said tubular member to the hand-tight plane.

3. A tubular member as recited in claim 2 in which the number of turns (N) of said first tubular member relative to said second tubular member needed to yield the end of said recessed portion of said tubular member to give a selected mating pressure is calculable in accordance with the following equations:

(5) $\quad P_b = \dfrac{E\delta(b^2-a^2)(c^2-b^2)}{2b(b^2)(c^2-a^2)}$ (6) $\quad \delta = \dfrac{(T)(P)(N)}{2}$ (7) $\quad N = \dfrac{(2b)(b^2)(c^2-a^2)(P_b)(2)}{(E)(b^2-a^2)(c^2-b^2)(T)(P)}$ where:

$E$ = modulus of elasticity, p.s.i.
$c$ = ½ outside diameter of the second tubular member, in.
$P$ = thread pitch, in./thd.
$N$ = number of turns past intimate contact between the second tubular member and pin (first tubular member).

4. A tubular connection for use with tubular membres adapted to conduct high pressure fluids comprising two male tubular members and a female coupling member, each tubular member having a threaded external tapered end and threadedly connected to said coupling member, each end being recessed internally and each recess having a selected length (L) extending from the beginning of each recess to the end of each of said tubular members, the threads on each tubular member extending from the ends thereof axially at least over the length of said recess until said threads intersect with the radial outermost portion of each tubular member, each recess having a selected depth $(d)$ extending radially from the interior unrecessed surface of each of said tubular members to the surface of deepest depth of each recess to form a pressure seal at the threaded interface between the end of each of said tubular member and said coupling member when each of said tubular members is threadedly connected to said coupling member through premature yielding, said depth ($d$) of said recess being calculable in accordance with the following equations:

(1) $$2b_d = 2b - (T)(L_1)$$

(2) $$\delta_{t_a} = \frac{2P_b b^2}{b^2 - a^2}$$

(3) $$a = b\left[1 + \frac{2P_b}{\delta_{t_a}}\right]^{1/2}$$

(4) $$d = a_d - a$$

where:

$2b_d$ = pitch diameter at end of pin (each tubular member), in.
$2b$ = pitch diameter hand-tight plane, in.
T = thread taper, in./in.
$L_1$ = distance from the hand-tight plane to the end of the pin (each tubular member), in.
$\delta_{t_a}$ = tangential or hoop stress, p.s.i.
$P_b$ = pressure between mating surfaces, p.s.i.
$a$ = ½ inside diameter pin (each tubular member), in.
$a_d$ = ½ inside diameter at recess, in.
$d$ = depth of recess, in.

5. A tubular connection as recited in claim 4 in which the length (L) of each of said recesses varies from a minimum of approximately four times the pitch to a maximum of the distance from the end of each tubular member to the hand-tight plane of each connection to said coupling.

6. A tubular connection as recited in claim 5 in which the number of turns (N) of each tubular member in said coupling relative to said coupling needed to yield the end of each recessed portion of said tubular members to give a selected mating pressure is calculable in accordance with the following equations:

(5) $$P_b = \frac{E(b^2 - a^2)(c^2 - b^2)}{2b(b^2)(c^2 - a^2)}$$

(6) $$\delta = \frac{(T)(P)(N)}{2}$$

(7) $$N = \frac{(2b)(b^2)(c^2 - a^2)(P_b)(2)}{(E)(b^2 - a^2)(c^2 - b^2)(T)(P)}$$

where:

E = modulus of elasticity, p.s.i.
c = ½ outside diameter of the coupling, in.
P = thread pitch, in./thd.
N = number of turns past intimate contact between the coupling and pin (each tubular member).

References Cited

UNITED STATES PATENTS

| | | | |
|---|---|---|---|
| 1,474,905 | 11/1923 | Keszthelyi | 287—125 X |
| 2,239,942 | 4/1941 | Stone et al. | 285—110 |
| 2,380,690 | 7/1945 | Graham | 285—333 X |
| 3,100,657 | 8/1963 | Pistole et al. | 285—417 X |
| 1,302,022 | 4/1919 | Drewry | 285—107 |
| 2,107,716 | 2/1938 | Singleton | 285—175 |
| 3,214,198 | 10/1965 | Peuchmaur | 285—110 |

FOREIGN PATENTS

| | | |
|---|---|---|
| 1,488,719 | 6/1967 | France. |
| 641,087 | 1/1937 | Germany. |
| 539,139 | 8/1941 | Great Britain. |

DAVID J. WILLIAMOWSKY, Primary Examiner

DAVE W. AROLA, Assistant Examiner

U.S. Cl. X.R.

285—417